(12) United States Patent
Pellolio et al.

(10) Patent No.: US 11,024,166 B2
(45) Date of Patent: Jun. 1, 2021

(54) METHOD, APPARATUS, AND COMPUTER PROGRAM PRODUCT FOR ESTIMATING TRAFFIC SPEED THROUGH AN INTERSECTION

(71) Applicant: HERE Global B.V., Eindhoven (NL)

(72) Inventors: Filippo Pellolio, Chicago, IL (US); James Fowe, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 275 days.

(21) Appl. No.: 15/386,716

(22) Filed: Dec. 21, 2016

(65) Prior Publication Data
US 2018/0174447 A1   Jun. 21, 2018

(51) Int. Cl.
*G08G 1/052* (2006.01)
*G08G 1/01* (2006.01)
*H04W 4/02* (2018.01)

(52) U.S. Cl.
CPC .......... *G08G 1/052* (2013.01); *G08G 1/0112* (2013.01); *G08G 1/0129* (2013.01); *G08G 1/0133* (2013.01); *G08G 1/0141* (2013.01); *H04W 4/025* (2013.01)

(58) Field of Classification Search
CPC .......... G08G 1/05; G08G 1/02; G08G 1/0141; G08G 1/0108; G08G 1/0125
USPC ......................................................... 701/119
See application file for complete search history.

(56) References Cited

U.S. PATENT DOCUMENTS

| | | | | |
|---|---|---|---|---|
| 6,151,539 A * | 11/2000 | Bergholz | ................ | G01S 17/89 701/25 |
| 7,576,661 B2 | 8/2009 | Mochizuki | | |
| 8,050,854 B1 * | 11/2011 | Chandra | .................. | G08G 1/07 340/917 |
| 8,744,735 B2 * | 6/2014 | Inoguchi | .............. | G08G 1/0112 701/118 |
| 8,922,392 B1 * | 12/2014 | Chandra | .................. | G08G 1/07 340/907 |
| 9,709,406 B2 * | 7/2017 | Bastiaensen | ........... | G01C 21/26 |
| 10,339,807 B2 * | 7/2019 | MacNeille | ....... | G08G 1/096791 |

(Continued)

OTHER PUBLICATIONS

Fabrizi, V. et al.; "A Pattern Matching Approach to Speed Forecasting of Traffic Networks"; Eur. Transp. Res. Rev (2014) 6:333-342.

*Primary Examiner* — Khoi H Tran
*Assistant Examiner* — Rodney P King
(74) *Attorney, Agent, or Firm* — Alston & Bird LLP

(57) ABSTRACT

A method is provided for gathering probe data and using the gathered data to establish traffic speeds for various paths through an intersection. Methods may include receiving probe data from a plurality of probes approaching an intersection along a common road segment; receiving probe data from the plurality of probes exiting the intersection along two or more different road segments; determining traffic speed for each path through the intersection from the common road segment based on the received probe data from the plurality of probes approaching the intersection along the common road segment and the received probe data from the plurality of probes exiting the intersection along two or more different road segments; and generating an indication of the traffic speed for each path through the intersection to be provided for display on a graphical representation of the intersection.

26 Claims, 14 Drawing Sheets

(56) References Cited

U.S. PATENT DOCUMENTS

| | | | |
|---|---|---|---|
| 2002/0082767 A1* | 6/2002 | Mintz | G08G 1/01 |
| | | | 701/117 |
| 2009/0292456 A1* | 11/2009 | Inoguchi | G09B 29/007 |
| | | | 701/118 |
| 2011/0087433 A1* | 4/2011 | Yester | G08G 1/163 |
| | | | 701/301 |
| 2011/0276257 A1 | 11/2011 | Zaistu et al. | |
| 2011/0320115 A1* | 12/2011 | Oh | G01C 21/3469 |
| | | | 701/420 |
| 2012/0001770 A1* | 1/2012 | Oh | G08G 1/0112 |
| | | | 340/905 |
| 2012/0265428 A1 | 10/2012 | Zaistu et al. | |
| 2012/0307065 A1* | 12/2012 | Mimeault | G01S 17/89 |
| | | | 348/149 |
| 2014/0266798 A1* | 9/2014 | Witte | G08G 1/096827 |
| | | | 340/907 |
| 2014/0288810 A1* | 9/2014 | Donovan | G08G 1/0116 |
| | | | 701/117 |
| 2015/0300835 A1* | 10/2015 | Fowe | G01C 21/20 |
| | | | 701/410 |
| 2016/0063857 A1 | 3/2016 | Fowe et al. | |
| 2017/0089717 A1* | 3/2017 | White | G01C 21/3658 |
| 2018/0225965 A1* | 8/2018 | MacNeille | G08G 1/096741 |

* cited by examiner

METHOD, APPARATUS, AND COMPUTER PROGRAM PRODUCT FOR ESTIMATING TRAFFIC SPEED THROUGH AN INTERSECTION

TECHNOLOGICAL FIELD

An example embodiment of the present invention relates to traffic speed estimation and, more particularly, to establishing different traffic speeds for differing paths through an intersection.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

Traffic data that is provided on digital maps is generally based on crowd-sourced data from mobile devices or probe data. The traffic data is typically reflective of a collective group of mobile devices traveling along a road segment, with each road segment having a traffic speed that is established based on an average travel speed along that segment. However, crowd-sourced traffic data can be unreliable in certain circumstances.

BRIEF SUMMARY

A method, apparatus, and computer program product are provided in accordance with an example embodiment for gathering probe data and using the gathered data to establish traffic speeds for various paths through an intersection. According to an example embodiment described herein, a map services provider system may be provided. The system may include a memory configured to receive probe data points from a plurality of probes, where the probe data comprises at least one of heading information and location information for each probe data point, and processing circuitry configured to: receive probe data form a plurality of probes approaching an intersection along a common road segment, where the probe data comprises a speed for each of the plurality of probes along the common road segment; receive probe data from the plurality of probes exiting the intersection along two or more different road segments, where the probe data comprises a speed for each of the plurality of probes and a direction corresponding to one of the two or more different road segments for each of the plurality of probes; determine traffic speed for each path through the intersection from the common road segment based on the received probe data from the plurality of probes approaching the intersection along the common road segment and the received probe data from the plurality of probes exiting the intersection along two or more different road segments, where a path corresponding to each probe is established based on the common road segment and one of the two or more different road segments; and generate an indication of the traffic speed for each path through the intersection to be provided for display on a graphical representation of the intersection.

Certain embodiments of the system may include processing circuitry further configured to map-match each of the plurality of probes exiting the intersection along two or more different road segments to one of the two or more different road segments based on the probe data direction. The processing circuitry may be configured to establish a path for each probe including the common road segment and the map-matched road segment of the two or more different road segments. The processing circuitry may optionally be configured to: determine if any of the probe data from the plurality of probes approaching the intersection along the common road segment corresponds to a traffic light related decrease in speed; and eliminate probe data corresponding to a traffic light related decrease in speed from consideration in determining traffic speed. Determining if any of the probe data from the plurality of probes approaching the intersection along the common road segment corresponds to a traffic light related decrease in speed may include causing the processing circuitry to: average the probe data speed from a plurality of probe data points for each probe traveling through the intersection; determine a standard deviation of the probe data speed from a plurality of probe data points for each probe traveling through the intersection; and determine that probe data having a speed more than a standard deviation multiplied by a predetermined factor below the average speed corresponds to a traffic light related decrease in speed.

Certain embodiments of the processing circuitry for determining if any of the probe data from the plurality of probes approaching the intersection along the common road segment corresponds to a traffic light related decrease in speed may include processing circuitry configured to: determine for each probe of the plurality of probes a number of probe data points above a predetermined speed; determine for each probe of the plurality of probes a number of probe data points below a predetermined speed; and determine that probe data of the plurality of probes includes a decrease in speed related to a traffic light in response to the number of probe data points below the predetermined speed being below a predefined ratio relative to the number of probe data points above the predetermined speed for the probe. The processing circuitry configured to generate an indication of the traffic speed for each path through the intersection to be provided for display on a graphical representation of the intersection may include processing circuitry configured to: establish a direction of the common road segment; generate, for each path through the intersection having a different indication of the traffic speed, a representation of the common road segment including an indication of the traffic speed; and provide for display of the representations of the common road segment spaced apart from one another along a direction normal to the common road segment.

An example embodiment may provide an apparatus including at least one processor and at least one memory including computer program code. The at least one memory and the computer program code configured to, with the processor, cause the apparatus to at least: receive probe data from a plurality of probes approaching an intersection along a common road segment, where the probe data includes a speed for each of the plurality of probes along the common road segment; receive probe data from the plurality of probes exiting the intersection along two or more different road segments, where the probe data includes a speed for each of the plurality of probes and a direction corresponding to one of the two or more different road segments for each of the plurality of probes; determine traffic speed for each path through the intersection from the common road segment based on the received probe data from the plurality of probes approaching the intersection along the common road segment and the received probe data from the plurality of probes exiting the intersection along two or more different road segments, where a path corresponding to each probe is established based on the common road segment and one of the two or more different road segments; and generate an indication of the traffic speed for each path through the intersection to be provided for display on a graphical representation of the intersection.

Certain embodiments of the apparatus may be caused to map-match each of the plurality of probes exiting the intersection along two or more different road segments to one of the two or more different road segments based on the probe data direction. The apparatus may optionally be caused to establish a path for each probe including the common road segment and the map-matched road segment of the two or more different road segments. The apparatus of an example embodiment may be caused to: determine if any of the probe data from the plurality of probes approaching the intersection along the common road segment corresponds to a traffic light related decrease in speed; and eliminate the probe data corresponding to a traffic light related decrease in speed from consideration in determining the traffic speed. Determining if any of the probe data from the plurality of probes approaching the intersection along the common road segment corresponds to a traffic light related decrease in speed may include causing the apparatus to: average the probe data speed from a plurality of probe data points for each probe traveling through the intersection; determine a standard deviation of the probe data speed from a plurality of probe data points for each probe traveling through the intersection; and determine that probe data having a speed more than a standard deviation multiplied by a predetermined factor below the average speed corresponds to a traffic light related decrease in speed.

According to certain embodiments, determining if any of the probe data from the plurality of probes approaching the intersection along the common road segment corresponds to a traffic light related decrease in speed may include causing the apparatus to: determine for each probe of the plurality of probes a number of probe data points above a predetermined speed; determine for each probe of the plurality of probes a number of probe data points below a predetermined speed; and determine that the probe data from a probe of the plurality of probes includes a decrease in speed related to a traffic light in response to the number of probe data points below the predetermined speed being below a predefined ratio relative to the number of probe data points above the predetermined speed for the probe. Causing the apparatus to generate an indication of the traffic speed for each path through the intersection to be provided for display on a graphical representation of the intersection may include causing the apparatus to: establish a direction of the common road segment; generate, for each path through the intersection having a different indication of the traffic speed, a representation of the common road segment including an indication of the traffic speed; and provide for display of the representations of the common road segment spaced apart from one another along a direction normal to the common road segment.

Certain embodiments may provide a method including: receiving probe data from a plurality of probes approaching an intersection along a common road segment, where the probe data includes a speed for each of the plurality of probes along the common road segment; receiving probe data from the plurality of probes exiting the intersection along two or more different road segments, where the probe data includes a speed for each of the plurality of probes and a direction corresponding to one of the two or more different road segments for each of the plurality of probes; determining traffic speed for each path through the intersection from the common road segment based on the received probe data from the plurality of probes approaching the intersection along the common road segment and the received probe data from the plurality of probes exiting the intersection along two or more different road segments, where a path corresponding to each probe is established based on the common road segment and one of the two or more different road segments; and generating an indication of the traffic speed for each path through the intersection to be provided for display on a graphical representation of the intersection.

Methods of certain example embodiments may include map-matching each of the plurality of probes exiting the intersection along two or more different road segments to one of the two or more different road segments based on the probe data direction. Methods may include establishing a path for each probe including the common road segment and the map-matched road segment of the two or more different road segments. Methods may optionally include: determining if any of the probe data from the plurality of probes approaching the intersection along the common road segment corresponds to a traffic light related decrease in speed; and eliminating probe data corresponding to a traffic light related decrease in speed from consideration in determining traffic speed. Determining if any of the probe data from the plurality of probes approaching the intersection along the common road segment corresponds to a traffic light related decrease in speed may include: averaging the probe data speed from a plurality of probe data points for each probe traveling through the intersection; determining a standard deviation of the probe data speed from a plurality of probe data points for each probe traveling through the intersection; and determining that probe data having a speed more than a standard deviation multiplied by a predetermined factor below the average speed corresponds to a traffic light related decrease in speed.

According to certain embodiments, determining if any of the probe data from the plurality of probes approaching the intersection along the common road segment corresponds to a traffic light related decrease in speed may include: determining for each probe of the plurality of probes a number of probe data points above a predetermined speed; determining for each probe of the plurality of probes a number of probe data points below the predetermined speed; and determining that probe data from a probe of the plurality of probes includes a decrease in speed related to a traffic light in response to the number of probe data points below the predetermined speed being below a predefined ratio relative to the number of probe data points above the predetermined speed for the probe. Generating an indication of the traffic speed for each path through the intersection to be provided for display on a graphical representation of the intersection may include: establishing a direction of the common road segment; generating, for each path through the intersection having a different indication of the traffic speed, a representation of the common road segment including an indication of the traffic speed; and providing for display of the representations of the common road segment spaced apparat from one another along a direction normal to the common road segment.

Example embodiments disclosed herein may provide a method including: receiving probe data from a plurality of probes approaching an intersection along a common road segment, where the probe data includes a speed for each of the plurality of probes along the common road segment; receiving probe data from the plurality of probes exiting the intersection, where the probe data includes a speed for each of the plurality of probes and a direction; determining, for each probe of the plurality of probes exiting the intersection, a road segment associated with the respective probe data in response to the direction of the respective probe data direction corresponding to a road segment; correlating, for each probe of the plurality of probes exiting the intersection, a probe identification with a corresponding probe identification of the plurality of probes approaching the intersection; determining a path for each probe through the intersection in response to correlating the probe identification of each probe exiting the intersection with a respective probe identification of the plurality of probes approaching the intersection; determining a speed for each path through the intersection based on probes of the plurality of probes having traveled the respective path; and generating an indication of the traffic speed for each path through the intersection.

According to an example embodiment, in response to the probe direction of probe data of a first probe failing to correspond to a road segment, methods may include: determining an average speed of the probe data of the first probe exiting the intersection; determining an average speed of the probe data of the plurality of probes exiting the intersection associated with each road segment to obtain an average speed for each road segment; and correlating the first probe with a road segment having an average speed within a predetermined margin of the average speed of the probe data of the first probe. Methods may include determining if any of the probe data from the plurality of probes approaching the intersection along the common road segment corresponds to a traffic light related decrease in speed; and eliminating probe data corresponding to a traffic light related decrease in speed from consideration in determining traffic speed.

According to certain embodiments, determining if any of the probe data from the plurality of probes approaching the intersection along the common road segment corresponds to a traffic light related decrease in speed may include: determining for each probe of the plurality of probes a number of probe data points above a predetermined speed; determining for each probe of the plurality of probes a number of probe data points below the predetermined speed; and determining that probe data from a probe of the plurality of probes includes a decrease in speed related to a traffic light in response to the number of probe data points below the predetermined speed being below a predefined ratio relative to the number of probe data points above the predetermined speed for the probe. Generating an indication of the traffic speed for each path through the intersection to be provided for display on a graphical representation of the intersection may include: establishing a direction of the common road segment; generating, for each path through the intersection having a different indication of the traffic speed, a representation of the common road segment including an indication of the traffic speed; and providing for display of the representations of the common road segment spaced apparat from one another along a direction normal to the common road segment.

An example embodiment provided herein may include a computer program product having at least one non-transitory computer-readable storage medium having computer-executable program code portions stored therein. The computer-executable program code portions including program code instructions configured to: receive probe data from a plurality of probes approaching an intersection along a common road segment; receive probe data from the plurality of probes exiting the intersection along two or more different road segments, where the probe data includes a speed for each of the plurality of probes and a direction corresponding to one of the two or more different road segments for each of the plurality of probes; determine traffic speed for each path through the intersection from the common road segment based on the received probe data from the plurality of probes approaching the intersection along the common road segment and the received probe data from the plurality of probes exiting the intersection along two or more different road segments, where a path corresponding to each probe is established based on the common road segment and one of the two or more different road segments; and generate an indication of the traffic speed for each path through the intersection to be provided for display on a graphical representation of the intersection.

Certain examples of a computer program product may include program code instructions to map-match each of the plurality of probes exiting the intersection along two or more different road segments to one of the two or more different road segments based on the probe data direction. The computer program product may include program code instructions to establish a path for each probe including the common road segment and the map-matched road segment of the two or more different road segments. The computer program product of an embodiment may include program code instructions to: determine if any of the probe data from the plurality of probes approaching the intersection along the common road segment corresponds to a traffic light related decrease in speed; and eliminate probe data corresponding to a traffic light related decrease in speed from consideration in determining traffic speed. Determining if any of the probe data from the plurality of probes approaching the intersection along the common road segment corresponds to a traffic light related decrease in speed may include program code instructions configured to: average the probe data speed from a plurality of data points for each probe traveling through the intersection; determine a standard deviation of the probe data speed from a plurality of probe data points for each probe traveling through the intersection; and determine that probe data having a speed more than a standard deviation multiplied by a predetermined factor below the average speed corresponds to a traffic light related decrease in speed.

Determining if any of the probe data from the plurality of probes approaching the intersection along the common road segment corresponds to a traffic light related decrease in speed may include program code instructions configured to: determine for each probe of the plurality of probes a number of probe data points above a predetermined speed; determine for each probe of the plurality of probes a number of probe data points below the predetermined speed; and determine that probe data from a probe of the plurality of probes includes a decrease in speed related to a traffic light in response to the number of probe data points below the predetermined speed being below a predefined ratio relative to the number of probe data points above the predetermined speed for the probe. The program code instructions configured to generate an indication of the traffic speed for each path through the intersection to be provided for display on a graphical representation of the intersection may include program code instructions configured to: establish a direction of the common road segment; generate, for each path through the intersection having a different indication of the traffic speed, a representation of the common road segment including an indication of the traffic speed; and provide for display of the representations of the common road segments spaced apart from one another along a direction normal to the common road segment.

BRIEF DESCRIPTION OF THE DRAWINGS

Figure 1:
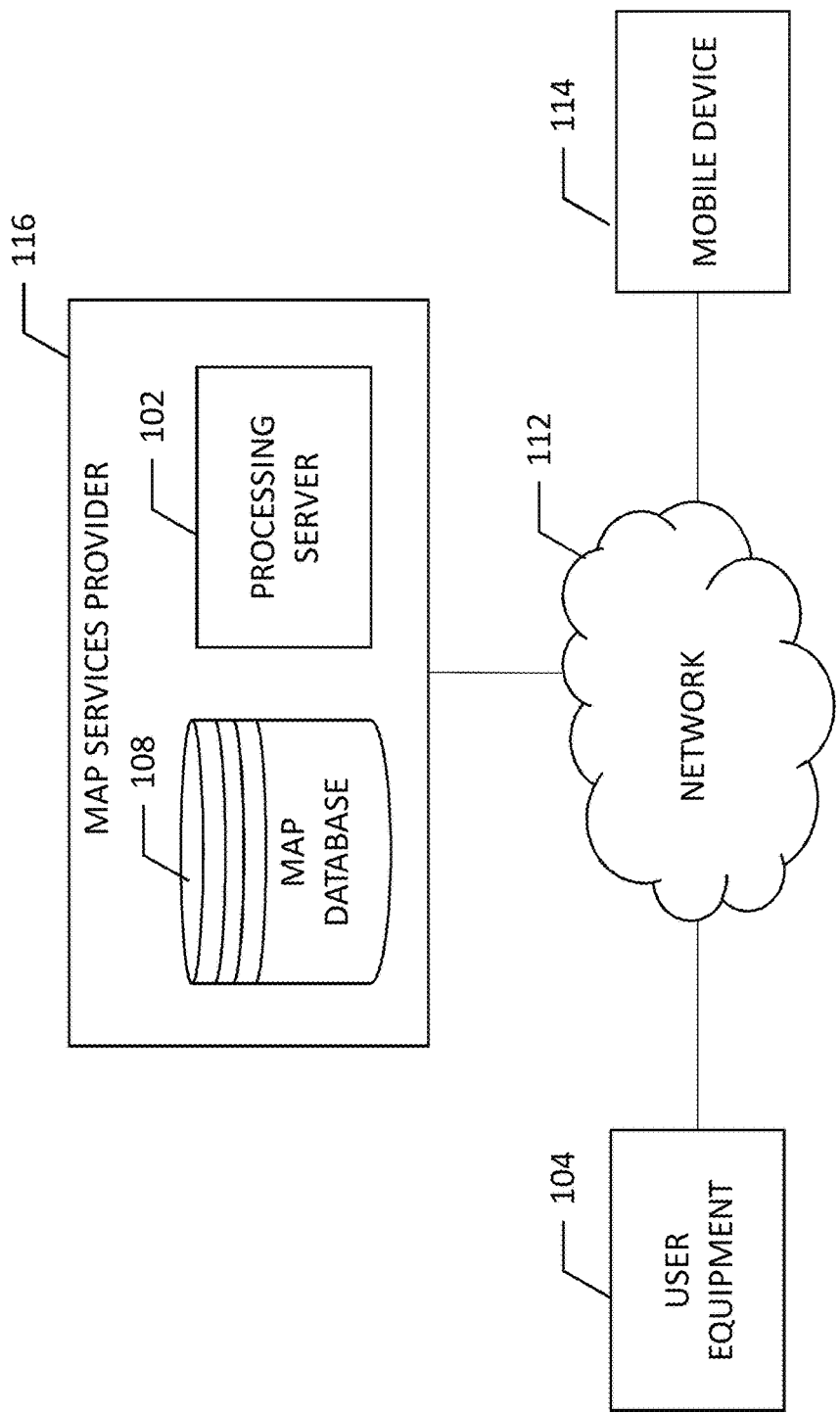
Figure 2:
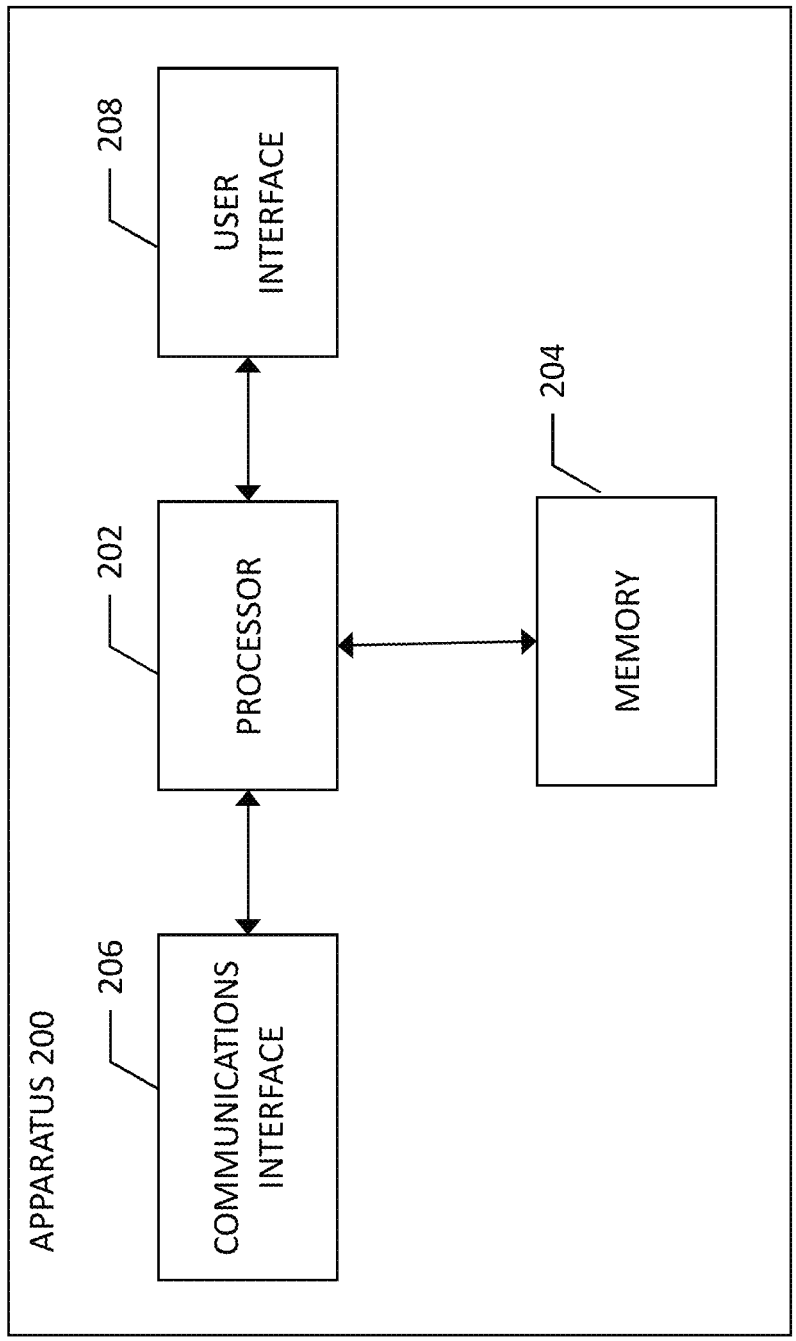
Figure 3:
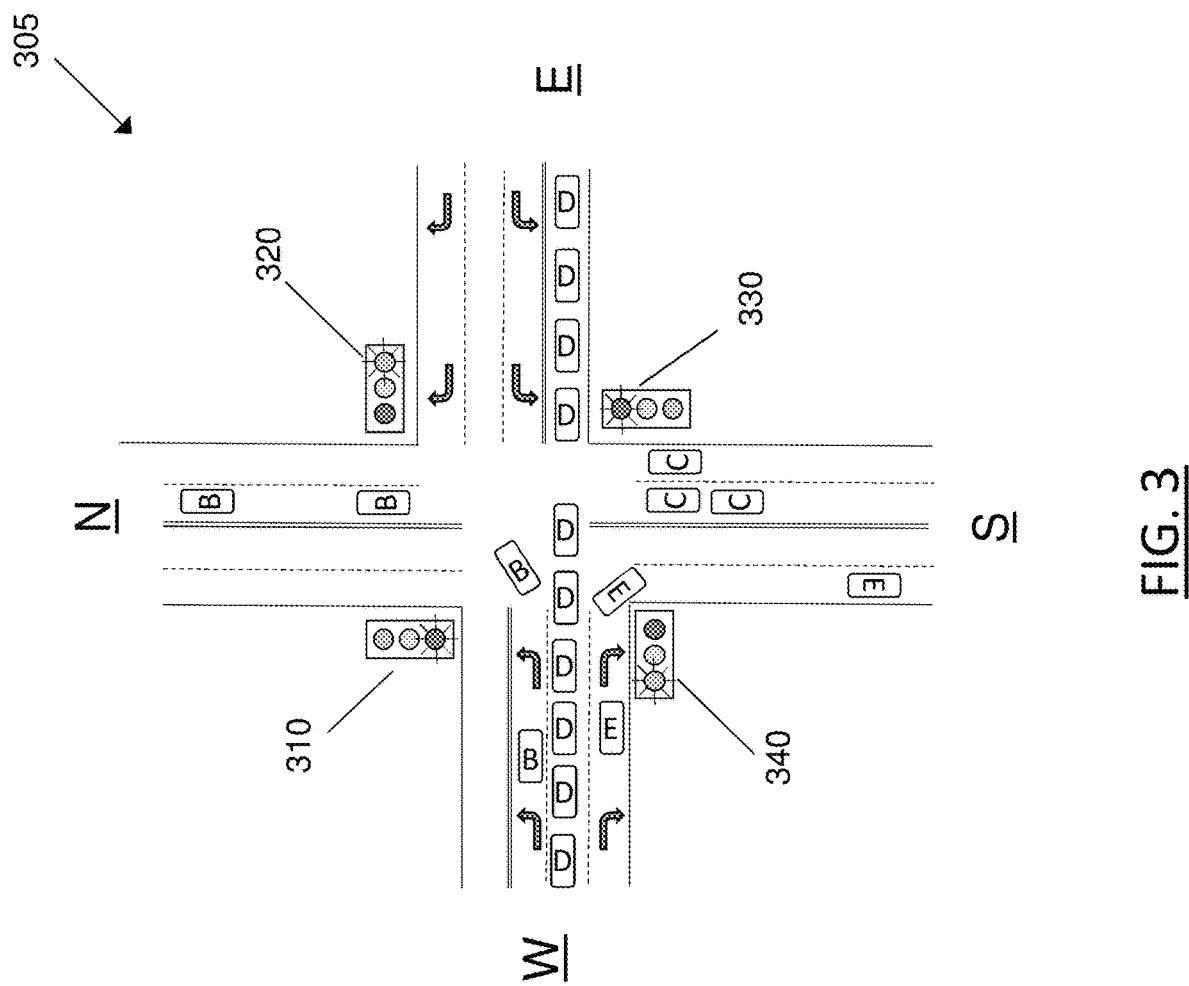
Figure 4:
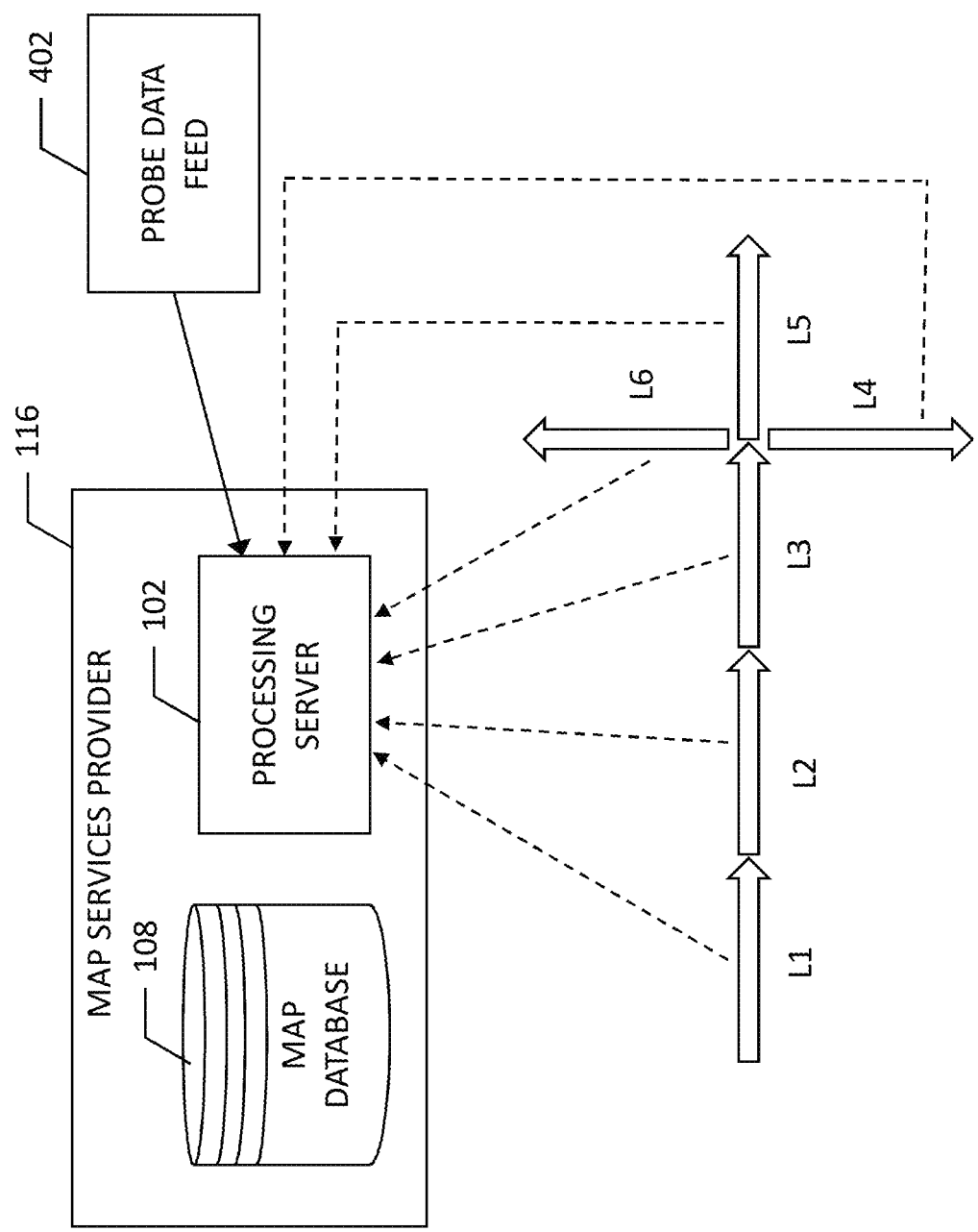
Figure 5:
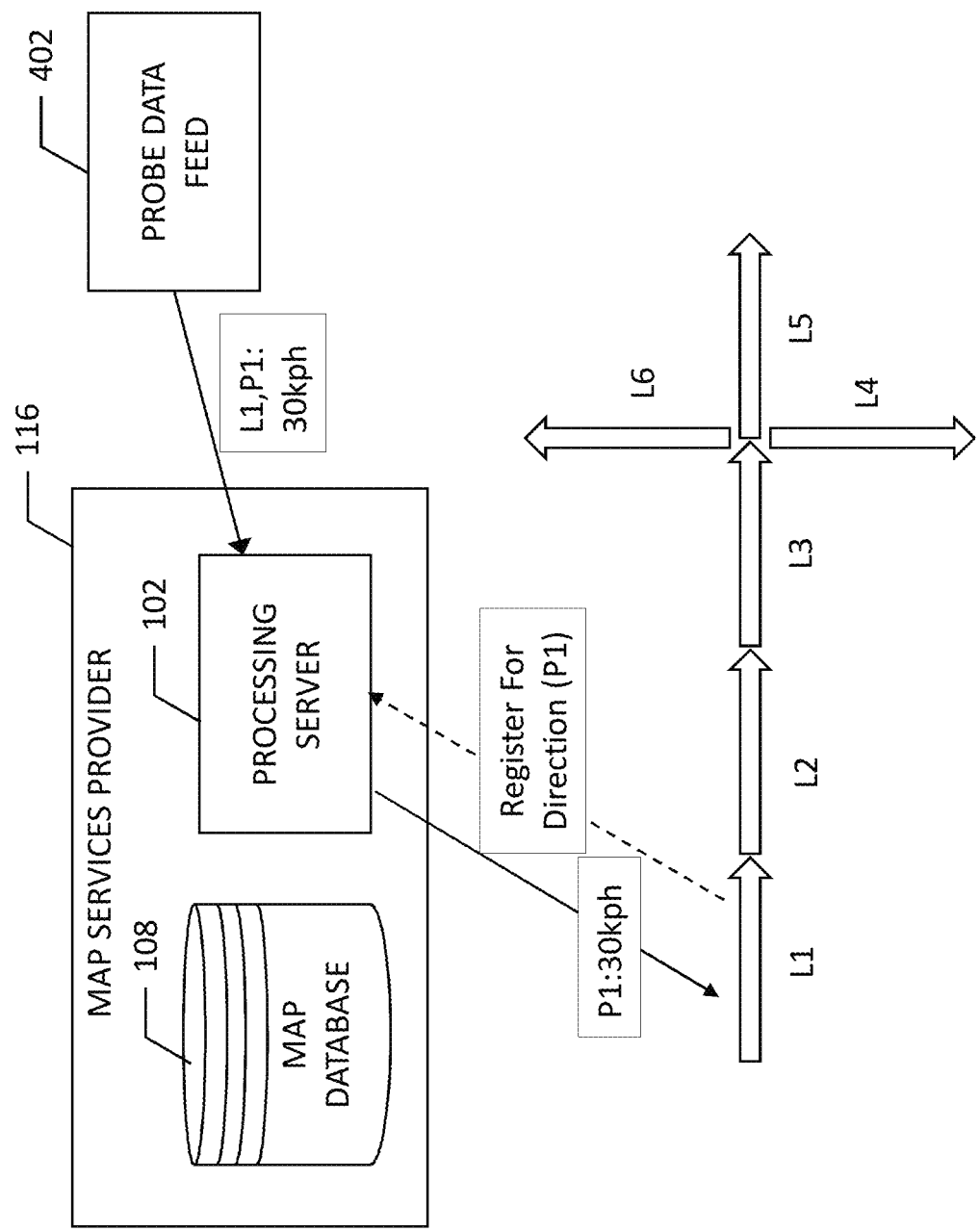
Figure 6:
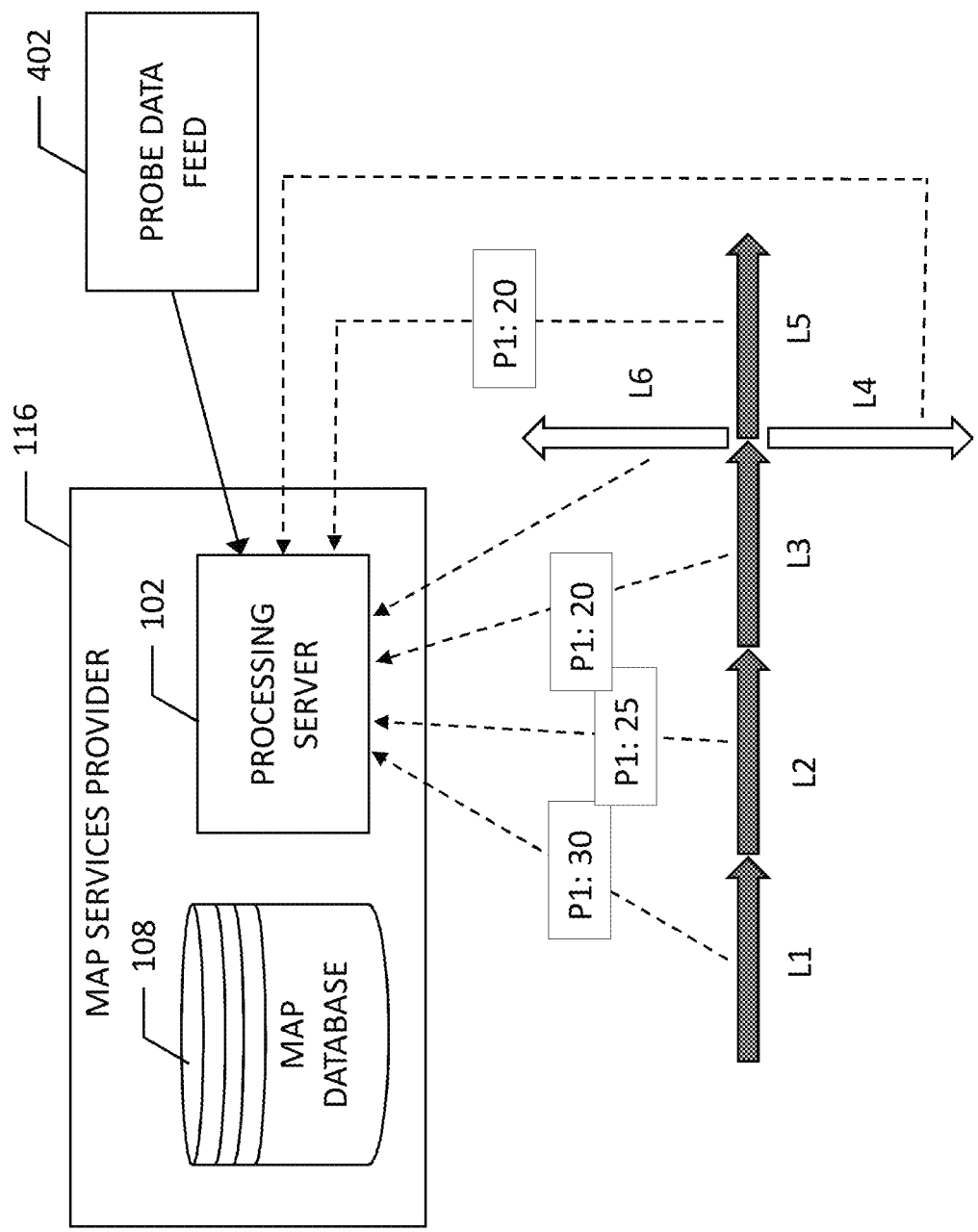
Figure 7:
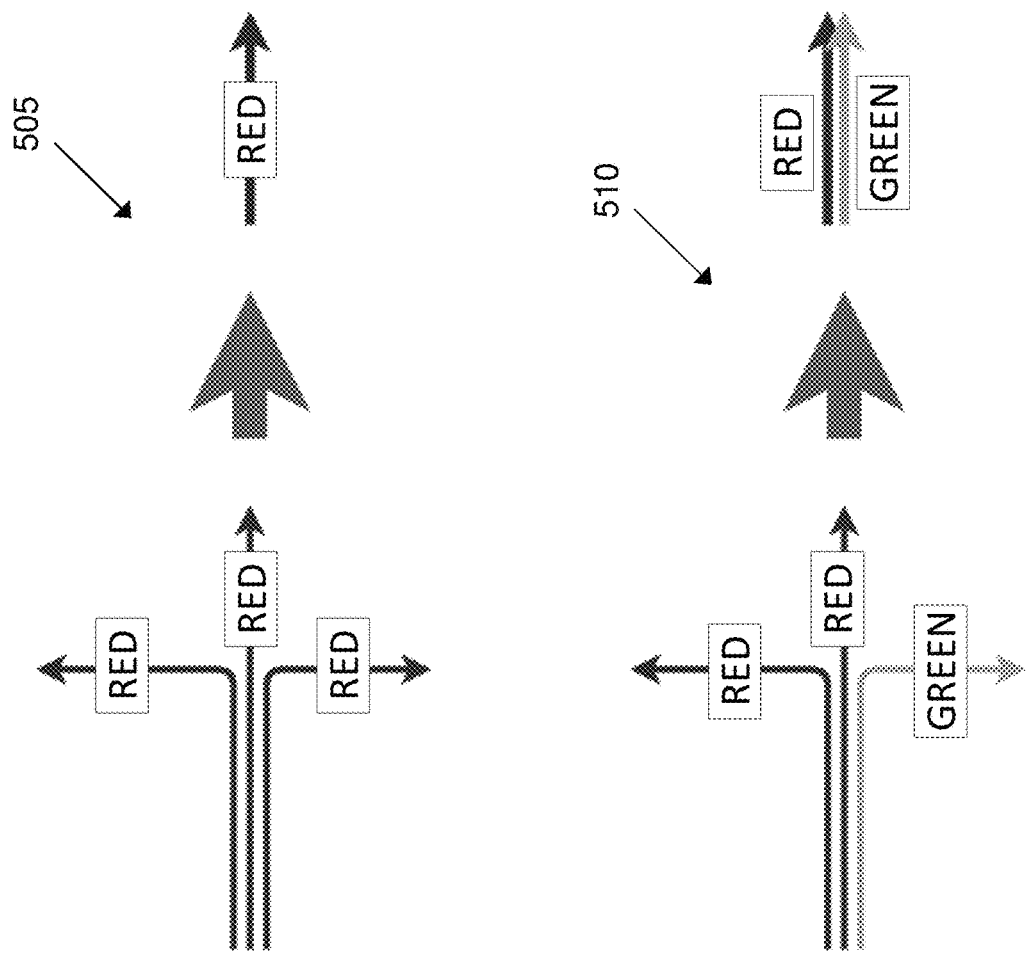
Figure 8:
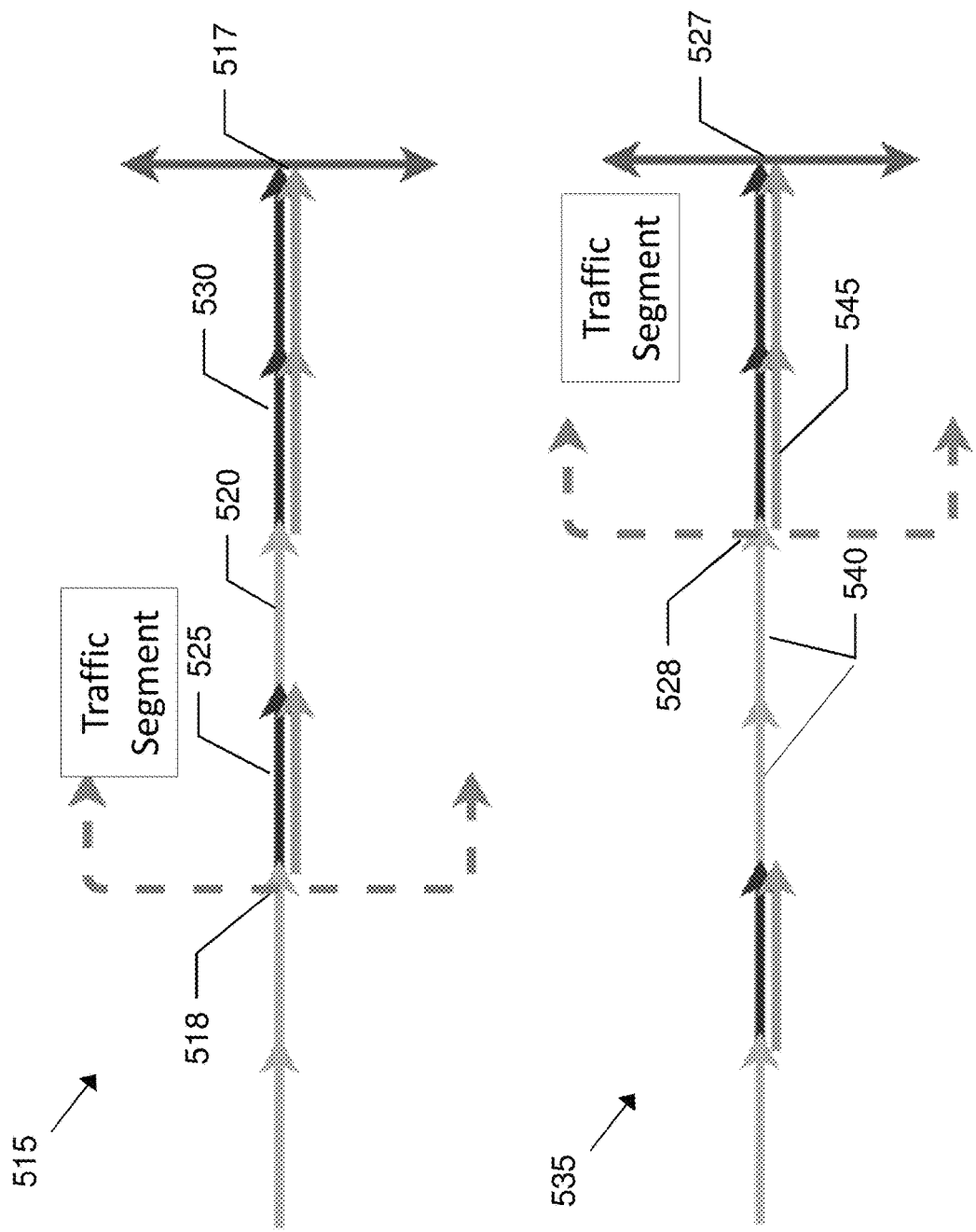
Figure 9:
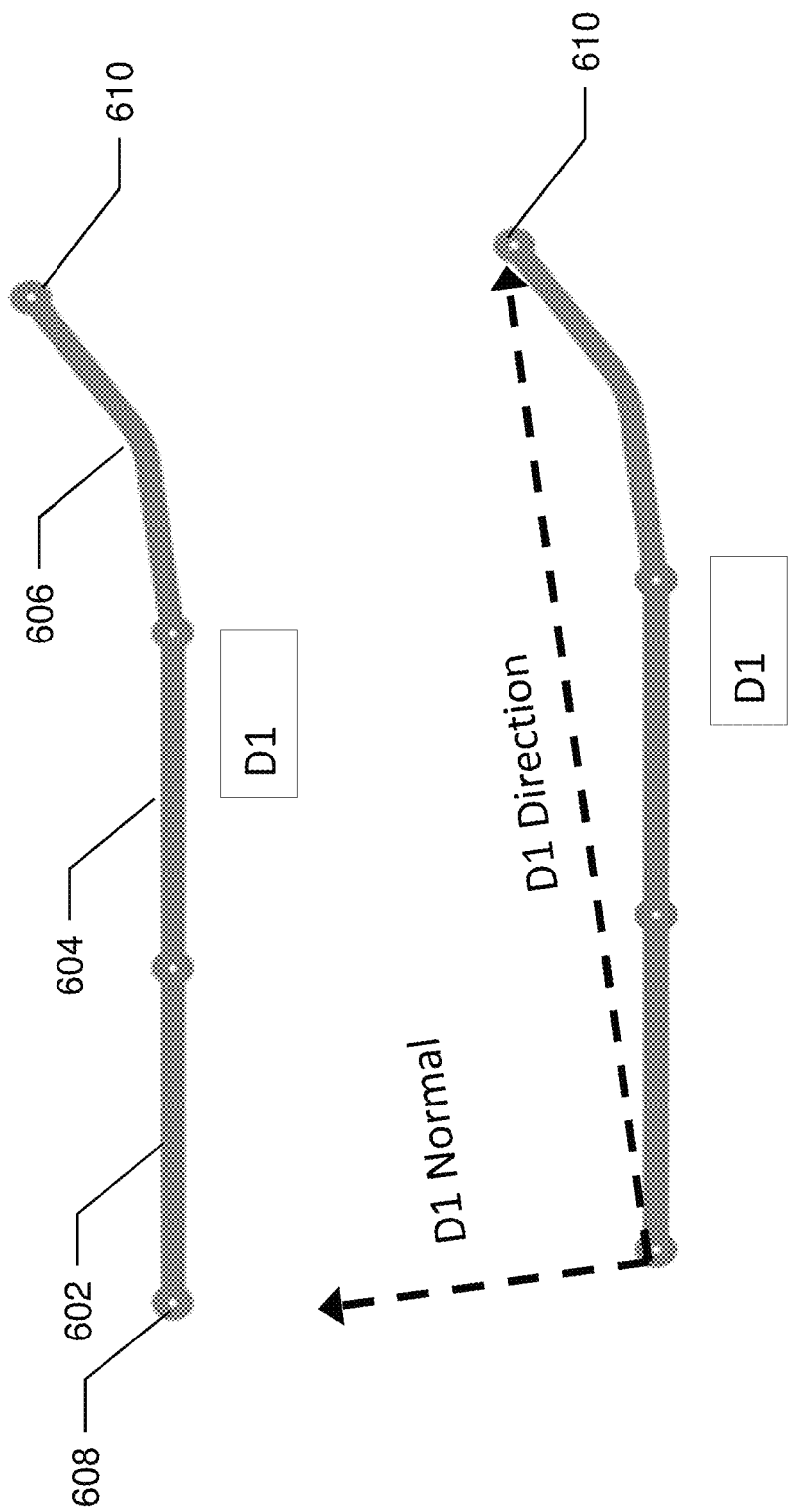
Figure 10:
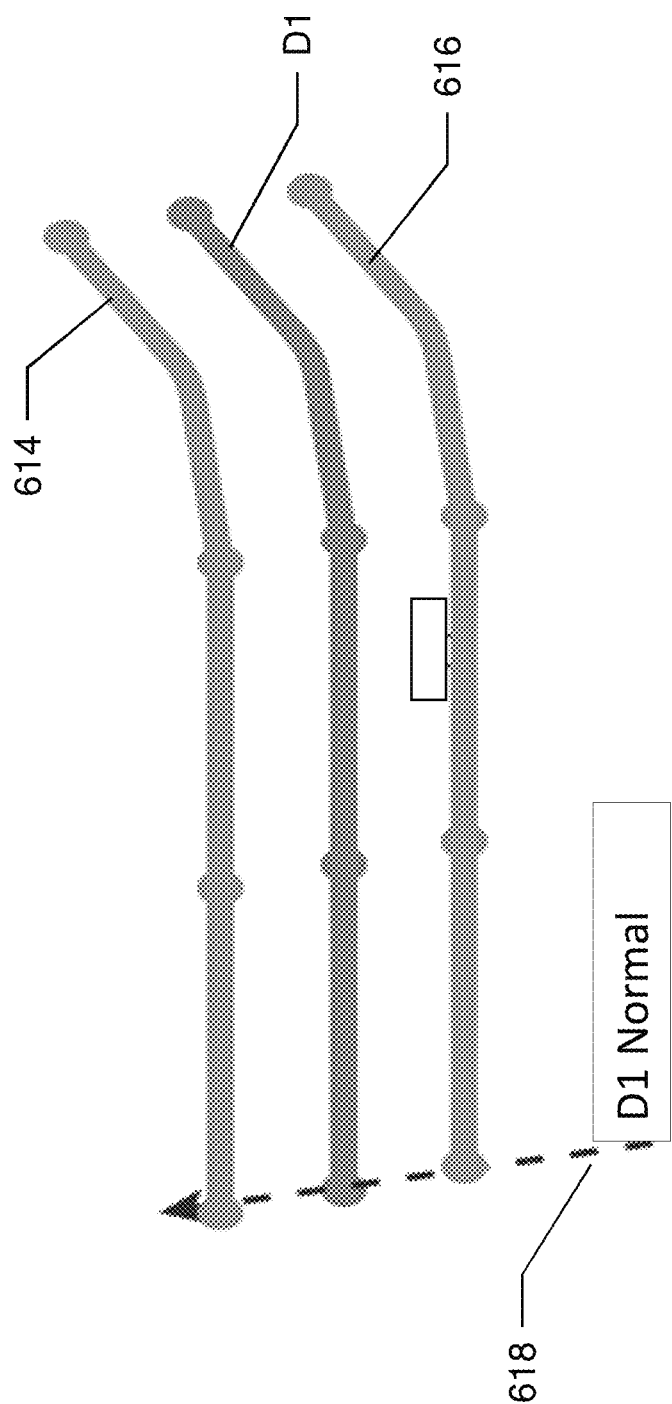
Figure 11:
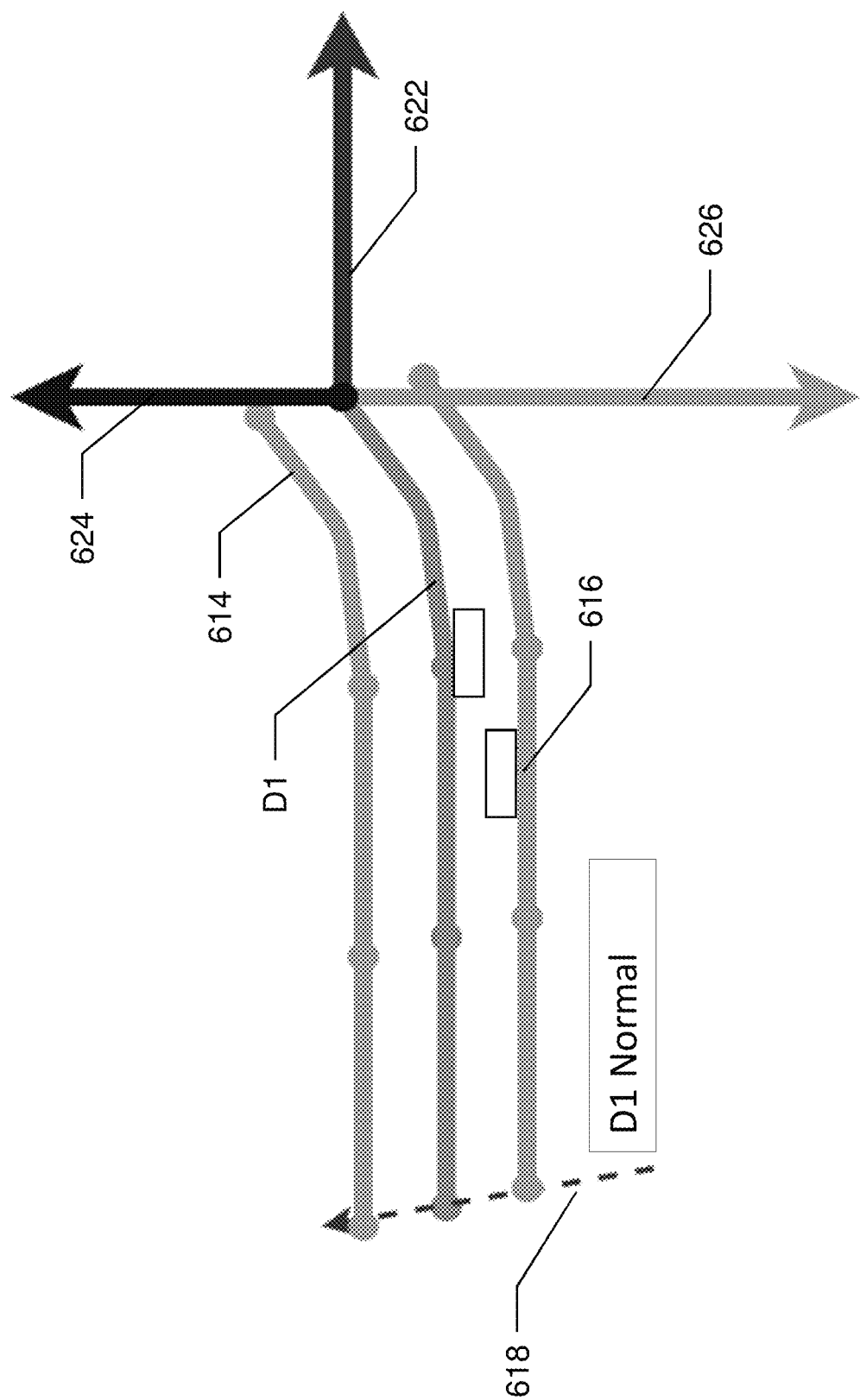
Figure 12:
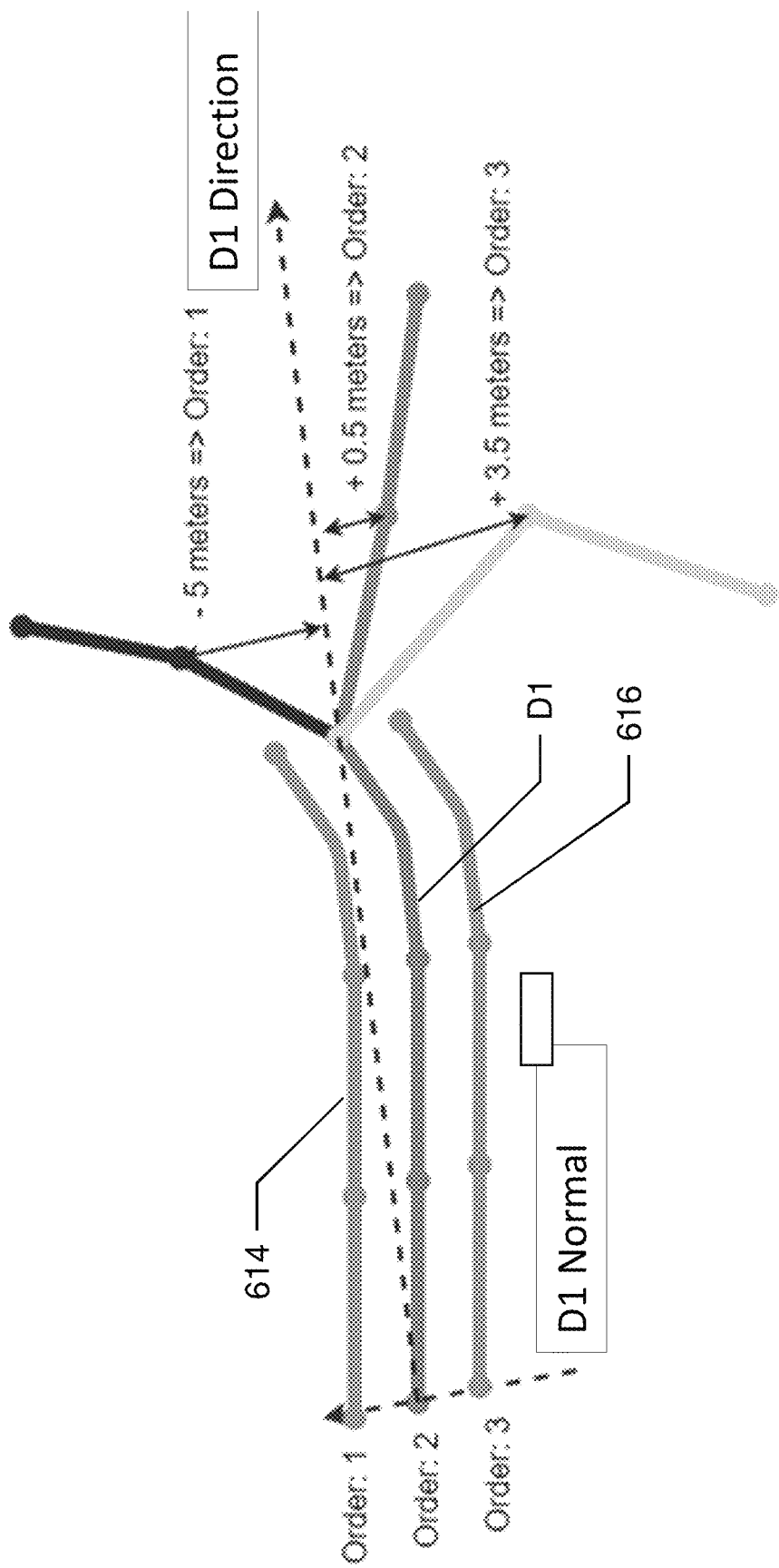
Figure 13:
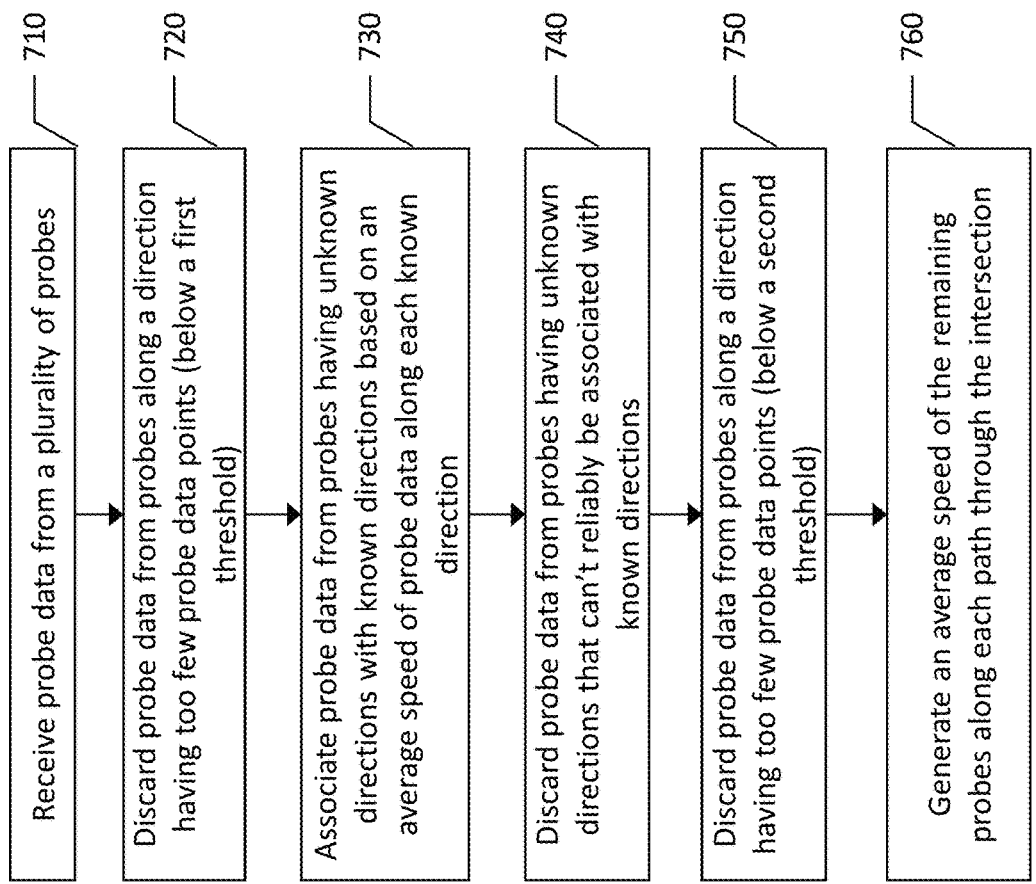
Figure 14:
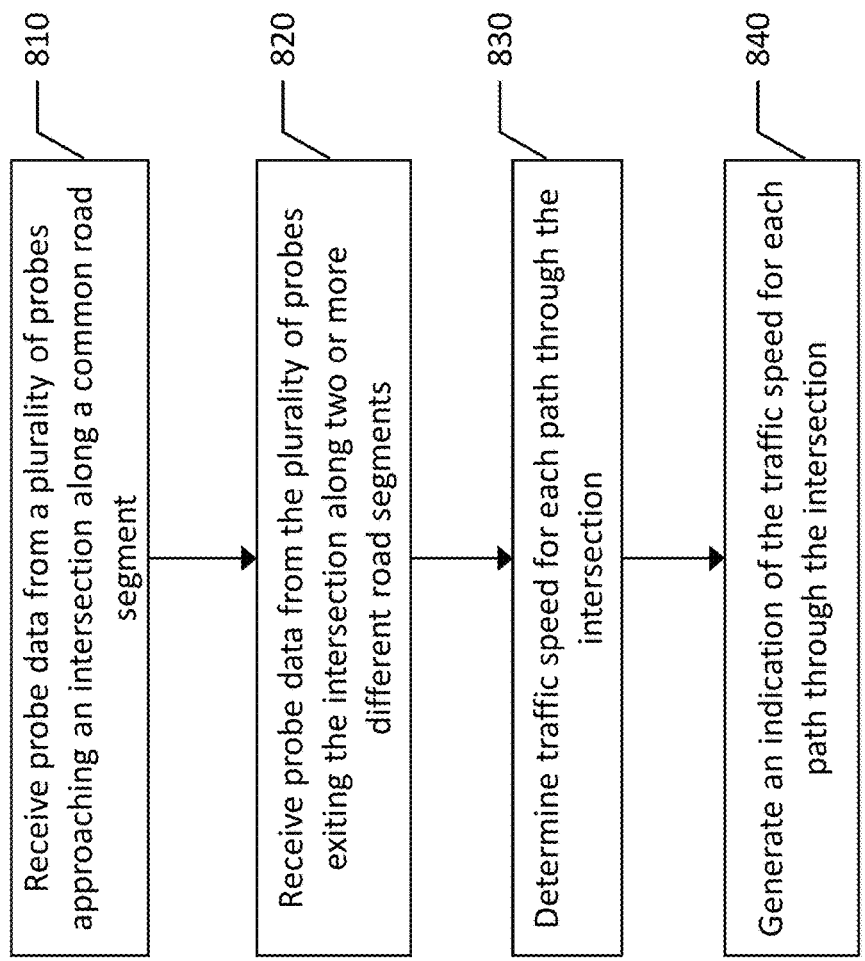

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for determining the traffic speed for a plurality of paths through an intersection in accordance with an example embodiment of the present invention;

FIG. 3 depicts an intersection including a plurality of vehicles and differing traffic speeds through an intersection, with some traffic being slowed by traffic congestion while other traffic is slowed by a traffic light, according to an example embodiment of the present invention;

FIG. 4 is an illustration of an example architecture for determining the traffic speed for a plurality of paths through an intersection in accordance with an example embodiment of the present invention;

FIG. 5 is an illustration of an example message flow for determining the traffic speed for a plurality of paths through an intersection in accordance with an example embodiment of the present invention;

FIG. 6 is an illustration of probe data points for a probe traveling along a path through an intersection in accordance with an example embodiment of the present invention;

FIG. 7 depicts a graphical representation of a plurality of traffic speeds along different paths through an intersection according to an example embodiment of the present invention;

FIG. 8 illustrates traffic segment determination in establishing paths through an intersection according to an example embodiment of the present invention;

FIG. 9 shows a graphical representation of a road segment including a plurality of sub-segments approaching an intersection and a direction determination thereof according to an example embodiment of the present invention;

FIG. 10 illustrates the presentation of several representations of the road segment approaching an intersection based on the direction determination of FIG. 9 according to an example embodiment of the present invention;

FIG. 11 depicts the presentation of several representations of the road segment and the paths through the intersection according to an example embodiment of the present invention;

FIG. 12 illustrates a method of determining a position of the several representations of the road segment approaching the intersection for presentation of traffic speeds along different paths through the intersection according to an example embodiment of the present invention;

FIG. 13 is a flowchart of a method for presenting differing traffic speeds for different paths through an intersection according to an example embodiment of the present invention; and FIG. 14 is a flowchart of another method for presenting differing traffic speeds for different paths through an intersection according to an example embodiment of the present invention.

DETAILED DESCRIPTION

Example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

A system, method, apparatus, and computer program product are provided herein in accordance with an example embodiment for establishing traffic speeds for a plurality of different paths through an intersection based on probe data received from a plurality of probes. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In certain embodiments, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for revising map geometry based on probe data received over two different periods of time. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

An example embodiment of the present invention may provide a mechanism for establishing vehicle traffic speeds for a plurality of paths through an intersection using probe data (e.g., from mobile device 114) from a plurality of vehicles traveling through the intersection. Embodiments may also provide a visual indication of the traffic along the plurality of distinct paths through the intersection.

Vehicle traffic speed determination proximate an intersection can be challenging since traffic will typically slow for traffic light cycles when vehicles slow or stop for a red light. This traffic slowing may not be related to vehicle traffic or congestion, but the due to the standard operation of the traffic light. Gathering of vehicle probe data proximate an intersection and grouping vehicle probe data by link segment or road segment may be misleading and may not properly convey the traffic flow through an intersection. Example embodiments of the present invention more accurately determine traffic speeds through an intersection by considering each path through an intersection separately while also mitigating the effects and influence on traffic speeds by traffic light cycles or phases. Example embodiments described herein use vehicle probe data from vehicles approaching and exiting an intersection to establish traffic speeds for each path through the intersection, providing more accurate traffic speed/congestion information to a user, while improving predicted estimated times of arrival and path determination.

FIG. 3 illustrates an example intersection 205 in which traffic speed may conventionally be inaccurate with respect to certain paths through the intersection. The south-to-north traffic represented by vehicles "C" may be stopped at a red phase of the traffic signal 330. This stopped traffic may be misinterpreted by a conventional map services provider as traffic congestion since three vehicles ("C") have probe data points reflecting a speed of zero proximate the intersection. As shown, the traffic on the south-to-north lanes is low, such that the traffic would be or will be traveling at a reasonable rate of speed (e.g., the posted speed limits) when the traffic signal 330 phase is green.

FIG. 3 also illustrates traffic approaching from the west in three lanes. There is a left turn lane in which vehicles "B" are traveling, a right turn lane in which vehicles "E" are traveling, and a straight lane in which vehicles "D" are traveling. Traffic in the left turn lane (a west-to-north path through the intersection) and right turn lane (a west-to-south path through the intersection) may be traveling at a speed that is essentially free-flow traffic since traffic congestion along those two paths is minimal. However, traffic driving straight through the intersection represented by vehicles "D" in the west-to-east path is congested and may be slowed. Conventionally, the traffic speed for the road segment approaching the intersection from the west may be averaged among all traffic traveling along that segment approaching the intersection. As there are more vehicles "D" than vehicles "B" and "E", the probe data from these vehicles may indicate that traffic speed may have a very low average speed, indicative of heavy traffic congestion. However, vehicles turning from west-to-north or west-to-south may experience little or no traffic congestion. Thus, conventional traffic speed determination may not accurately represent the traffic flow through the various paths of the intersection 305.

Embodiments described herein detect traffic through vehicle probe data in real time or near real time with the ability to discern different traffic speeds through an intersection based on different paths through the intersection, even when approaching from the same road segment. Methods can also be used to view historical or past traffic patterns through an intersection for establishing traffic congestion trends or to predict future traffic congestion along routes. Methods described herein detect if there are different traffic patterns or speed divergence among cars exiting an intersection in different directions. Methods use a backtracking technique to communicate a vehicle direction before and after an intersection to provide an accurate reflection of the particular path through the intersection taken by the vehicle. Example embodiments use vehicle-specific probe identification or probe-ID information to propagate upstream and eventual downstream direction of the vehicle to ascertain the appropriate probe speed for the path taken by the vehicle associated with the probe-ID. This method can be used with intersections of any level of complexity, whether they are three-way intersections, four-way, five-way, or more.

FIG. 4 illustrates an example architecture overview of an implementation of an embodiment of the present invention. Probe data is generated by mobile devices, such as mobile device 114 of FIG. 1, as they traverse a road network including intersections. This probe data may include a real time feed of probe data 402 that supplies the processing server 102 of the map services provider 116. The probe data received at the processing server 102 is map-matched to road links or road segments, such as L1-L6 depicted in FIG. 4. Probe data points are associated with a respective road segment on which they were obtained and a direction along the road segment. The probe data points may include the probe-ID, which is an identifier that is unique to a probe and/or unique to a vehicle. The processing server 102 may associate the probe-ID and associated speed with a link, such as L1.

The probe data may be stored in a data structure as associated with the road segments, such that all probe data points that are map-matched to link L1 are stored as data points gathered on link L1. This may enable traffic speed for link L1 to be established based on the plurality of collected probe data points having an associated speed and direction. Optionally, the link data associated with a probe may be stored in a data structure such that a route the probe has taken is stored as associated with the probe, for example, in a database of the map services provider 116.

One example embodiment of probe data collection and map-matching to a link is illustrated in FIG. 5, which shows the probe data from probe-ID P1 from the probe data feed 402 received by the processing server 102. The probe data may be map matched at the processing server 102, or map-matched prior to receipt at the processing server, such as in the probe data feed 402. The processing server 102 may associate the probe data point with road segment L1, or send the probe data point to a digital representation of road segment L1, which may be stored link L1 in the map database 108. In this manner, the probe data point may be associated with the road segment (link L1) for use in data analysis of traffic along road segment L1 in real time or for historical data. The processing server may receive in response registration of probe data point P1 for direction.

This may enable the processing server to retrieve probe data for P1 from link L1 once a path through the intersection is known.

The path of one probe is illustrated in FIG. 6 which depicts the same road segments L1-L6 of FIG. 4. A probe (P1) may produce probe data points on L1, L2, L3, and L5, and those probe data points may include speed and direction. The speed is shown in FIG. 5 as 30 kilometers per hour (kph) on road segment L1, 25 kph on road segment L2, 20 kph on road segments L3 and L5. While FIG. 6 may illustrate a single probe data point from probe P1 on each segment, probes may generate multiple data points on one or more road segments. The probe data point generation or collection time may be periodic based on a specific time between probe data points, based on speed and time where the faster a probe travels, the less frequently probe data points are generated, and/or based on a density of road segments in the vicinity of a probe (e.g., less frequent in rural areas, more frequent in urban areas).

According to example embodiments described herein, a single probe corresponding to a probe-ID (e.g., probe P1 of FIG. 6) may be tracked as it approaches an intersection (e.g., along road segments L1, L2, and L3), and tracked as it exits an intersection (e.g., along road segment L5). Using techniques described below, according to certain example embodiments, a direction of a probe exiting an intersection may be established. Once established, the probe ID may be used to correlate the path of the probe exiting the intersection with the path of the probe entering the intersection, and determining the speed of the probe as it enters the intersection. This method, referred to herein as "backtracking," may complete the path for a probe entering and exiting the intersection to establish a path through the intersection and a speed of the probe throughout that path. Using this established path for a single probe, methods of the present invention may then be able to estimate whether the speed of the probe as measured at the probe data points is hindered by traffic or potentially hindered by a red phase of a traffic signal at the intersection. As all speeds from the probe data points of a single probe traversing the intersection are known, a calculation can be made to estimate if a low speed encountered through the intersection is abnormal or "surprising" with respect to the average speed of the probe. If a low speed is surprisingly low, then the low speed may be regarded as due to a red traffic signal. If the probe speed is low on average or consistently slow, the low speed may be associated with traffic congestion. Methods described herein may establish what is a surprisingly low speed.

A first method of defining a surprisingly low speed for a vehicle and the probe data associated therewith may include using a probability model. The probe data speeds for a single probe through an intersection may be gathered. The beginning of the intersection may be established based on how far before the intersection distinct paths through the intersection are found with regard to traffic flow as further described below. This beginning of the intersection may be the point from which speed data may be gathered for establishing a "surprising" low speed. The first road segment after the intersection may be the end of the path through the intersection across which a surprising low speed is estimated. A first link after the intersection may be used as once through a traffic control signal, it can be presumed that the traffic signal is no longer slowing the traffic, unless the traffic exiting the intersection is encountering traffic from a next intersection along the route. However, for purposes of establishing an unexpected or surprising low speed, we assume that traffic beyond an intersection is no longer hindered by the traffic signal of that intersection, and only a single road segment beyond the intersection is used for determining a surprising low speed condition.

Using a probability model for establishing a surprising low speed condition may involve gathering the speed values for the probe data points for a single probe through an intersection, from beginning road segment to the first segment after the intersection as noted above. The speed values may be averaged over the path through the intersection, and a standard deviation of the speed values may be calculated. A pre-determined confidence measure may be used below which the speed of the vehicle associated with the probe is determined to be surprisingly slow, and assumed to be related to a red traffic signal or stoplight. The confidence measure may be, for example, two standard deviations below the average speed or two sigma. This confidence measure may be adjusted based on different intersection geometries and traffic volumes, among other influencing factors. If the path of a single probe includes a surprisingly low speed as established through the probability model, it is presumed that the vehicle encountered a red traffic signal and the vehicle's abnormally or surprisingly low speed on the path through the intersection may not be considered traffic congestion related.

A second method of determining if a vehicle speed is surprisingly low as it traverses the intersection uses a ratio of high-speed probe data points to low-speed probe data points. A low-speed probe data point may include a probe data point having a speed below a predetermined value, while a high-speed probe data point may include a probe data point having a speed above a predetermined value. In some cases, the predetermined value may be the same, for example 10 kph. Using a value of 10 kph, a probe data point below 10 kph may be considered a low-speed data point, while a probe data point above 10 kph may be considered a high-speed data point. If the ratio of low-speed data points to high-speed data points is below a predetermined value, the low-speed data points may be attributed to red traffic signals. For example, if the high-speed data points outnumber the low-speed data points 3:1 or 2:1, the low-speed data points may be attributed to red traffic signals. Conversely, if the ratio of low-speed data points to high-speed data points is 1:1, the low-speed data points may be attributable to traffic congestion and slow traffic along the path through the intersection.

Probe data associated with traffic signal related speed reductions may be eliminated or filtered out such that the probe data that is estimated to not include vehicle speeds influenced by the traffic signals of an intersection may be used to determine the traffic speeds associated with different paths through the intersection. Certain example embodiments of the present invention may implement an algorithm to analyze probe data and determine the traffic speed of various paths through an intersection. The probe data used by an algorithm may be grouped according to the link or links approaching an intersection along a common road segment. For example, with respect to FIGS. 4-6, probes associated with road segment L1 may include the following:
L1 Probes: {L4:[0:2, 4:2, 10:5], L5[0:2, 15:2], L6:[0:1, 20:3], unknown: [0:5, 15:2, 20:2]}

Where L4, L5, and L6 represent the directions taken by the probe data contained in their arrays, while the unknown array contains probes of which the direction has not yet been established. The numbers of the array represent the probe speed followed by the number of probes at that speed. For example, with respect to probes that entered the intersection along road segment L1 and exited the intersection along link L4, there were two probes with a speed of zero kph, two probes with a speed of 4 kph, and five probes with a speed of 10 kph. The speeds of the array may be speed ranges such that probes are grouped according to the speed range in which they fall (e.g. 0-1 kph, 2-5 kph, 6-10 kph, 10-30 kph, 40+ kph). Any number of speed ranges may be included while the aforementioned ranges are merely examples.

According to an example algorithm, the directions exiting the intersection for which too little probe data exists may be discarded. For example, if a path through an intersection exits the intersection along a direction or road segment/link that has only two probe data points, that direction may be discarded as there is insufficient data to establish a reliable speed along that path through the intersection. Too little data may allow the influence of outliers to be significant, which renders the data unreliable. The threshold below which a direction may be discarded may be fixed, or it may be adjustable. For example, for an intersection that has low traffic flow, the threshold number of probe data points may be lower to compensate for the overall low-flow through the intersection. In a heavily travelled intersection, the threshold may be raised since there should be an abundance of probe data points on road segments exiting the intersection.

The probe data for the probes along the paths of the remaining directions exiting the intersection may be averaged for each direction which may help in eliminating or mitigating faulty probe data. Direction-less probes, or probe data that is not appropriately map-matched to a road segment exiting the intersection may be correlated with the known directions and the probe data from each of those directions. Probe data of unknown directions may be assigned using the k-nearest neighbors approach. For each probe with an unknown direction or path, the average speed of each direction is compared against the speed of the probe having an unknown direction. If there is a direction that has an average speed close to that of a probe with an unknown direction or within a predetermined margin, and distinct from other directions, the probe with an unknown direction may be associated with the direction having the similar average speed. If no direction has a similar average speed, or if the probe having an unknown direction is similar to more than one direction, the probe data from the probe of an unknown direction may be discarded.

The algorithm of example embodiments may then determine if each direction has enough probe data points to produce a reliable speed associated with each direction. This may use a threshold that is higher than the threshold used to eliminate directions before associating probe data from probes of unknown directions with known directions. The average speed for each direction may then be recalculated to obtain an average speed for each direction exiting an intersection. Once each direction has an average speed, each direction may be considered as separate links or road segments, and the traffic factor or congestion level can be computed for each path through the intersection using the directions of the road segments exiting the intersection. Using the speed ratio of the average traffic speed along a path over the free-flow traffic speed of historical data from the intersection may establish whether traffic congestion is present. Traffic congestion levels may be categorized based on the ratio of the average current speed (or speed over a window in time) to the free-flow traffic speed along the same path. The traffic congestion may be categorized as high traffic, medium traffic, or low traffic, or any number of variations there between. These may each have a threshold for the ratio of traffic speed to free-flow traffic speed, or thresholds for a delta of the traffic speed to the free-flow traffic speed. For example, traffic speed that is 20 kph below typical free-flow traffic speed may be medium traffic, while traffic speed that is 50 kph below typical free-flow traffic speed may be heavy traffic.

Once the traffic level for each path through an intersection (e.g., along each direction exiting an intersection from a common road segment approaching an intersection), the traffic level for each path through the intersection may be used for a variety of different purposes. In one example, the traffic level information may be presented to a user (such as a user of user equipment 104) to enhance the depiction of a representation of a road on a digital map interface, such as in a navigation system. The traffic data may optionally be used to issue traffic warnings/alerts to a user if there is abnormal traffic along a user's route (either pre-programed or anticipated by historical driving patterns). The traffic data may also be used to facilitate route planning (e.g., to avoid traffic congestion) and the calculation of estimated time of arrival based upon travel time factoring in the traffic data. Traffic data regarding paths through an intersection may optionally be used by autonomous or semi-autonomous driving systems to navigate intersections in the most efficient manner given a destination and alternative routes.

When traffic levels for two or more paths through the intersection are the same, the graphical indication of the traffic level may be merged in relation to the common road segment approaching the intersection that they each include. Separate paths along the common road segment approaching the intersection may only have a traffic level distinguished in response to the traffic level being different from at least one other path through the intersection using the same common road segment approaching the intersection. FIG. 7 illustrates such an example embodiment with the three paths through an intersection of example 505 each having heavy traffic signified by the red arrows. The traffic along the common road approaching the intersection may be signified as shown with a single red line or arrow. Conversely, as shown in the example of 510, one path may have low traffic, signified by a green line or arrow, while the other two paths through the intersection have heavy traffic, signified by the red arrows. The common road segment approaching the intersection may have traffic represented by two lines, including a first red line representing the two paths having heavy traffic merged, and a second line that is green representing the one path having low traffic through the intersection.

As noted above, a path through an intersection may include a point at which traffic speed divergence occurs before the intersection begins, where the traffic is associated with the intersection. Vehicle paths through an intersection may not only start on the first traffic segment before the intersection such that accurate traffic speed estimation may need to begin two or more road segments before the intersection along the common road into the intersection. In order to establish traffic speed divergence among paths through an intersection, traffic speed divergence may be analyzed along the links before the intersection in geographical order. As each vehicle probe is uniquely known through the Probe-ID, a path through an intersection can be traced back many road segments before the intersection. Paths that have divergent speeds may be traced back until two roads segment prior to the intersection having differing traffic patterns are found.

FIG. 8 illustrates such an example embodiment where the beginning of the divergent traffic speeds for different paths through the intersection are found. As shown, approaching intersection 517 in traffic diagram 515 there is a single road segment 520 that has a different traffic pattern than 530 and 525. Since it is only a single road segment, probe data from that segment may not be available due to the periodic nature of probe data collection. Thus, the single segment deviation from the traffic speeds of the paths approaching intersection 517 of segments 525 and 530 may be ignored, and the traffic segment used for diverging speed of paths through the intersection may begin at 518. For traffic diagram 535, analysis from the intersection 527 indicates two consecutive road links 540 having a different traffic pattern than the traffic pattern approaching the intersection 527 at road segment 545. Thus, the traffic segment in which divergent traffic speeds for different paths through the intersection begins at 528. The resultant traffic segment together with the road segment of the directions exiting the intersections are the dynamic segments of the present analysis for which traffic speeds are characterized according to their paths.

Once the dynamic segments of the road approaching the intersection and the road segments exiting the intersection have been established, probe data for all links or road segments that are determined to be part of the dynamic segment may be gathered to provide a complete picture of the traffic speeds of the various paths through an intersection from an approaching direction. This can be performed using the methods above of discarding probe data related to traffic signal slow-downs, discarding probe data along directions having too few probe data points, and averaging the probe data point speeds along each path to generate separate path-level traffic speed condition estimates to be communicated to a user for route guidance or planning.

Once traffic speeds are known for the various paths through an intersection, the path-level traffic may be provided for display to a user with visualization methods described herein. Digital representations of maps generally depict roads as a line along which a vehicle may travel with a representation of the vehicle on the line. One issue with depicting the different traffic speeds of different paths through an intersection may be that the path approaching the intersection is represented by a single line. Providing for presentation of multiple indicators of the traffic speeds approaching the intersection may be problematic due to space constraints and the shape/geometry of the path approaching the intersection. Methods described herein provide a way of presenting path-level traffic speeds through an intersection in a reliable, repeatable, and easily understood manner regardless of the map geometry.

Traffic speed is typically represented on a map by changing the color of a road segment or overlaying a road segment with a color line congruent to the road segment. Degrees of traffic congestion may also be represented by differing shades of colors to provide additional detail. For example, a red representation of a road segment may indicate heavy traffic congestion, while a dark red representation of a road segment may indicate severe or very heavy traffic congestion. An example embodiment disclosed herein uses is based on the geometry of the road segments and does not require a change to the data structure of a digital map in order to depict multiple traffic speeds on a single road segment. Multiple parallel lanes are created for a road segment using a normal vector to the direction of the path approaching the intersection. FIG. 9 illustrates a road segment D1 including plurality of sub-segments 602, 604, 606, that are part of the road segment D1 approaching an intersection at node 610. A direction vector of the road segment D1, D1 Direction, is established from the beginning node of the section 608 to the intersection at node 610. A normal vector to the direction vector of D1 is then ascertained as shown in FIG. 9. As shown in FIG. 10, additional lines representing the additional paths through the intersection may be generated and displaced from the original road segment D1 along the normal vector 618.

The additional lines 614, 616 may be displaced relative to road segment D1 based on the direction of the paths taken after the intersection. FIG. 11 illustrates the paths 614, D1, and 616 approaching the intersection and the directions taken after the intersection 624, 622, and 626, respectively. Two geometric properties may be used to perform sorting of the representations of traffic speed for each path through the intersection. As the order of the generated parallel lines along the normal direction is known, the second node of each road segment exiting the intersection may be used for the displacement direction since the first node for each road segment exiting the intersection would be the same (e.g., the intersection point). The distance from the direction vector of D1 is first determined and it is multiplied by the side of the direction vector of D1 in which the direction heads. This makes a displacement to one side of D1 a positive displacement, while displacement to the opposite side of D1 becomes negative. The output directions may then be sorted using this value, and assign to each direction the parallel lane that was created to represent the traffic flow through the intersection for each path.

FIG. 12 depicts the displacement and order of the added lines representing traffic flow through the intersection for additional paths. As shown, the displacement of the second node for the end of each road link leaving the intersection is determined from the direction vector of D1. The direction of the road segment associated with the path of 614 is −0.5 meters as it is on a first side of the direction vector of D1, while the direction of the road segment associated with the path of D1 is +0.5 meters, and of 616 it is +3.5 meters. The traffic speeds associated with each path through the intersection may be provided for display to a user by depicting each of the paths in a color representative of the traffic of the associated road segments.

FIGS. 13 and 14 illustrate flowcharts depicting a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 13 illustrates a flowchart of a method according to an example embodiment of the present invention. Probe data may be received from a plurality of probes at 710. Those probes may be probes that have traveled along road segments approaching an intersection. Probe data from probes along a direction exiting the intersection having too few probe data points using a first threshold may be discarded at 720. Probe data points exiting the intersection that are not map-matched to a specific road segment may be associated with a direction based on a similarity of average speeds along that direction exiting the intersection at 730. Probe data points from probes having unknown direction that cannot be reliably associated with known directions may be discarded at 740. Probe data points from probes along directions having too few probe data points using a second threshold may be discarded at 750. An average speed may then be generated for each path through the intersection at 760.

FIG. 14 illustrates another flowchart of a method according to an example embodiment of the present invention. Probe data may be received from a plurality of probes approaching an intersection along a common road segment at 810. Vehicles approaching an intersection along the same road segment may generate probe data that is received by, for example, the map services provider 116. Probe data from the same plurality of vehicles may be received as they exit the intersection along at least two different road segments heading in at least two distinct directions as shown at 820. The probe data collected in an example embodiment includes probe data from vehicles approaching an intersection along the same route, but diverging as they pass through the intersection. Using the individual probe data and knowing the path that each probe has followed through the intersection, the traffic speed for each path through the intersection is determined at 830. Based on the determined traffic speed for each path through the intersection, an indication of the traffic speed for each path through the intersection may be generated at 840 for presentation on a digital representation of a map of the intersection.

In an example embodiment, an apparatus for performing the methods of FIG. 13 or 14 above may comprise a processor (e.g., the processor 202) configured to perform some or each of the operations (710-760 or 810-840) described above. The processor may, for example, be configured to perform the operations (710-760 or 810-840) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 710-760 or 810-840 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A map services provider system comprising:
a memory configured to receive probe data points from a plurality of probes, the memory configured to:
receive probe data from a plurality of probes approaching an intersection along a common road segment, wherein the probe data comprises a speed for each of the plurality of probes along the common road segment;
receive probe data from the plurality of probes exiting the intersection along two or more different road segments, wherein the probe data comprises a speed for each of the plurality of probes and a direction corresponding to one of the two or more different road segments for each of the plurality of probes; and
processing circuitry configured to:
determine traffic speed for each path through the intersection from the common road segment based on the received probe data from the plurality of probes approaching the intersection along the common road segment and the received probe data from the plurality of probes exiting the intersection along two or more different road segments, wherein a path corresponding to each probe is established based on the common road segment and one of the two or more different road segments, wherein a path corresponding to each probe is established after the respective probe exits the intersection along one of the two or more different road segments; and
generate an indication of the traffic speed for each path through the intersection to be provided for display on a graphical representation of the intersection, wherein the traffic speed along the common road segment differs based on the path through the intersection.

2. The map services provider system of claim 1, wherein the processing circuitry is further configured to:
map-match each of the plurality of probes exiting the intersection along two or more different road segments to one of the two or more different road segments based on the probe data direction.

3. The map services provider system of claim 2, wherein the processing circuitry is further configured to:
establish a path for each probe comprising the common road segment and the map-matched road segment of the two or more different road segments.

4. The map services provider system of claim 1, wherein the processing circuitry is further configured to:
   determine if any of the probe data from the plurality of probes approaching the intersection along the common road segment corresponds to a traffic light related decrease in speed; and
   eliminate probe data corresponding to a traffic light related decrease in speed from consideration in determining traffic speed.

5. The map services provider system of claim 4, wherein causing the processing circuitry to determine if any of the probe data from the plurality of probes approaching the intersection along the common road segment corresponds to a traffic light related decrease in speed comprises causing the processing circuitry to:
   average the probe data speed from a plurality of probe data points for each probe traveling through the intersection;
   determine a standard deviation of the probe data speed from a plurality of probe data points for each probe traveling through the intersection; and
   determine that probe data having a speed more than a standard deviation multiplied by a predetermined factor below the average speed corresponds to a traffic light related decrease in speed.

6. The map services provider of claim 4, wherein causing the processing circuitry to determine if any of the probe data from the plurality of probes approaching the intersection along the common road segment corresponds to a traffic light related decrease in speed comprises causing the processing circuitry to:
   determine for each probe of the plurality of probes a number of probe data points above a predetermined speed;
   determine for each probe of the plurality of probes a number of probe data points below the predetermined speed; and
   determine that probe data from a probe of the plurality of probes includes a decrease in speed related to a traffic light in response to the number of probe data points below the predetermined speed being below a predefined ratio relative to the number of probe data points above the predetermined speed for the probe.

7. The map service provider of claim 1, wherein the processing circuitry configured to generate an indication of the traffic speed for each path through the intersection to be provided for display on a graphical representation of the intersection comprises processing circuitry configured to:
   establish a direction of the common road segment;
   generate, for each path through the intersection having a different indication of the traffic speed, a representation of the common road segment including an indication of the traffic speed; and
   provide for display of the representations of the common road segment spaced apart from one another along a direction normal to the common road segment.

8. The apparatus of claim 1, wherein causing the apparatus to generate an indication of the traffic speed for each path through the intersection to be provided for display on a graphical representation of the intersection comprises causing the apparatus to:
   establish a direction of the common road segment;
   generate, for each path through the intersection having a different indication of the traffic speed, a representation of the common road segment including an indication of the traffic speed; and
   provide for display of the representations of the common road segment spaced apart from one another along a direction normal to the common road segment.

9. An apparatus comprising at least one processor and at least one memory including computer program code, the at least one memory and computer program code configured to, with the processor, cause the apparatus to at least:
   receive probe data from a plurality of probes approaching an intersection along a common road segment, wherein the probe data comprises a speed for each of the plurality of probes along the common road segment;
   receive probe data from the plurality of probes exiting the intersection along two or more different road segments, wherein the probe data comprises a speed for each of the plurality of probes and a direction corresponding to one of the two or more different road segments for each of the plurality of probes;
   determine traffic speed for each path through the intersection from the common road segment based on the received probe data from the plurality of probes approaching the intersection along the common road segment and the received probe data from the plurality of probes exiting the intersection along two or more different road segments, wherein a path corresponding to each probe is established based on the common road segment and one of the two or more different road segments, wherein a path corresponding to each probe is established after the respective probe exits the intersection along one of the two or more different road segments;
   generate an indication of the traffic speed for each path through the intersection, wherein the traffic speed along the common road segment differs based on the path through the intersection; and
   provide the indication of traffic speed for each path through the intersection to an end user device.

10. The apparatus of claim 9, wherein the apparatus is further caused to:
    map-match each of the plurality of probes exiting the intersection along two or more different road segments to one of the two or more different road segments based on the probe data direction.

11. The apparatus of claim 10, wherein the apparatus is further caused to:
    establish a path for each probe comprising the common road segment and the map-matched road segment of the two or more different road segments.

12. The apparatus of claim 9, wherein the apparatus is further caused to:
    determine if any of the probe data from the plurality of probes approaching the intersection along the common road segment corresponds to a traffic light related decrease in speed; and
    eliminate probe data corresponding to a traffic light related decrease in speed from consideration in determining traffic speed.

13. The apparatus of claim 12, wherein causing the apparatus to determine if any of the probe data from the plurality of probes approaching the intersection along the common road segment corresponds to a traffic light related decrease in speed comprises causing the apparatus to:
    average the probe data speed from a plurality of probe data points for each probe traveling through the intersection;
    determine a standard deviation of the probe data speed from a plurality of probe data points for each probe traveling through the intersection; and determine that probe data having a speed more than a standard deviation multiplied by a predetermined factor below the average speed corresponds to a traffic light related decrease in speed.

14. The apparatus of claim 12, wherein causing the apparatus to determine if any of the probe data from the plurality of probes approaching the intersection along the common road segment corresponds to a traffic light related decrease in speed comprises causing the apparatus to:
determine for each probe of the plurality of probes a number of probe data points above a predetermined speed;
determine for each probe of the plurality of probes a number of probe data points below the predetermined speed; and
determine that probe data from a probe of the plurality of probes includes a decrease in speed related to a traffic light in response to the number of probe data points below the predetermined speed being below a predefined ratio relative to the number of probe data points above the predetermined speed for the probe.

15. A method comprising:
receiving probe data from a plurality of probes approaching an intersection along a common road segment, wherein the probe data comprises a speed for each of the plurality of probes along the common road segment;
receiving probe data from the plurality of probes exiting the intersection, wherein the probe data comprises a speed for each of the plurality of probes and a direction;
determining, for each probe of the plurality of probes exiting the intersection, a road segment associated with the respective probe data in response to the direction of the respective probe data direction corresponding to a road segment;
correlating, for each probe of the plurality of probes exiting the intersection, a probe identification with a corresponding probe identification of the plurality of probes approaching the intersection;
in response to correlating the probe identification of each probe exiting the intersection with a respective probe identification of the plurality of probes approaching the intersection, determining a path for the respective probe through the intersection;
determining a speed of each path through the intersection based on probes of the plurality of probes having traveled the respective path; and
generating an indication of the traffic speed for each path through the intersection, wherein the traffic speed along the common road segment differs based on the path through the intersection.

16. The method of claim 15, further comprising:
determining if any of the probe data from the plurality of probes approaching the intersection along the common road segment corresponds to a traffic light related decrease in speed; and
eliminating probe data corresponding to a traffic light related decrease in speed from consideration in determining traffic speed.

17. The method of claim 16, wherein determining if any of the probe data from the plurality of probes approaching the intersection along the common road segment corresponds to a traffic light related decrease in speed comprises:
averaging the probe data speed from a plurality of probe data points for each probe traveling through the intersection;
determining a standard deviation of the probe data speed from a plurality of probe data points for each probe traveling through the intersection; and
determining that probe data having a speed more than a standard deviation multiplied by a predetermined factor below the average speed corresponds to a traffic light related decrease in speed.

18. The method of claim 16, wherein determining if any of the probe data from the plurality of probes approaching the intersection along the common road segment corresponds to a traffic light related decrease in speed comprises:
determining for each probe of the plurality of probes a number of probe data points above a predetermined speed;
determining for each probe of the plurality of probes a number of probe data points below the predetermined speed; and
determining that probe data from a probe of the plurality of probes includes a decrease in speed related to a traffic light in response to the number of probe data points below the predetermined speed being below a predefined ratio relative to the number of probe data points above the predetermined speed for the probe.

19. The method of claim 15, wherein generating an indication of the traffic speed for each path through the intersection to be provided for display on a graphical representation of the intersection comprises:
establishing a direction of the common road segment;
generating, for each path through the intersection having a different indication of the traffic speed, a representation of the common road segment including an indication of the traffic speed; and
providing for display of the representations of the common road segment spaced apart from one another along a direction normal to the common road segment.

20. A computer program product comprising at least one non-transitory computer-readable storage medium having computer-executable program code portions stored therein, the computer-executable program code portions comprising program code instructions configured to:
receive probe data from a plurality of probes approaching an intersection along a common road segment, wherein the probe data comprises a speed for each of the plurality of probes along the common road segment;
receive probe data from the plurality of probes exiting the intersection along two or more different road segments, wherein the probe data comprises a speed for each of the plurality of probes and a direction corresponding to one of the two or more different road segments for each of the plurality of probes;
determine traffic speed for each path through the intersection from the common road segment based on the received probe data from the plurality of probes approaching the intersection along the common road segment and the received probe data from the plurality of probes exiting the intersection along two or more different road segments, wherein a path corresponding to each probe is established based on the common road segment and one of the two or more different road segments, wherein a path corresponding to each probe is established after the respective probe exits the intersection along one of the two or more different road segments; and
generate an indication of the traffic speed for each path through the intersection to be provided for display on a graphical representation of the intersection, wherein the traffic speed along the common road segment differs based on the path through the intersection.

21. The computer program product of claim 20, further comprising program code instructions configured to:

map-match each of the plurality of probes exiting the intersection along two or more different road segments to one of the two or more different road segments based on the probe data direction.

22. The computer program product of claim 21, further comprising program code instructions configured to:

establish a path for each probe comprising the common road segment and the map-matched road segment of the two or more different road segments.

23. The computer program product of claim 20, further comprising program code instructions configured to:

determine if any of the probe data from the plurality of probes approaching the intersection along the common road segment corresponds to a traffic light related decrease in speed; and eliminate probe data corresponding to a traffic light related decrease in speed from consideration in determining traffic speed.

24. The computer program product of claim 23, wherein the program code instructions configured to determine if any of the probe data from the plurality of probes approaching the intersection along the common road segment corresponds to a traffic light related decrease in speed comprises program code instructions configured to:

average the probe data speed from a plurality of probe data points for each probe traveling through the intersection;

determine a standard deviation of the probe data speed from a plurality of probe data points for each probe traveling through the intersection; and determine that probe data having a speed more than a standard deviation multiplied by a predetermined factor below the average speed corresponds to a traffic light related decrease in speed.

25. The computer program product of claim 23, wherein the program code instructions configured to determine if any of the probe data from the plurality of probes approaching the intersection along the common road segment corresponds to a traffic light related decrease in speed comprises program code instructions configured to:

determine for each probe of the plurality of probes a number of probe data points above a predetermined speed;

determine for each probe of the plurality of probes a number of probe data points below the predetermined speed; and determine that probe data from a probe of the plurality of probes includes a decrease in speed related to a traffic light in response to the number of probe data points below the predetermined speed being below a predefined ratio relative to the number of probe data points above the predetermined speed for the probe.

26. The computer program product of claim 20, wherein the program code instructions configured to generate an indication of the traffic speed for each path through the intersection to be provided for display on a graphical representation of the intersection comprises program code instructions configured to:

establish a direction of the common road segment;

generate, for each path through the intersection having a different indication of the traffic speed, a representation of the common road segment including an indication of the traffic speed; and provide for display of the representations of the common road segment spaced apart from one another along a direction normal to the common road segment.

* * * * *